Figure 1:
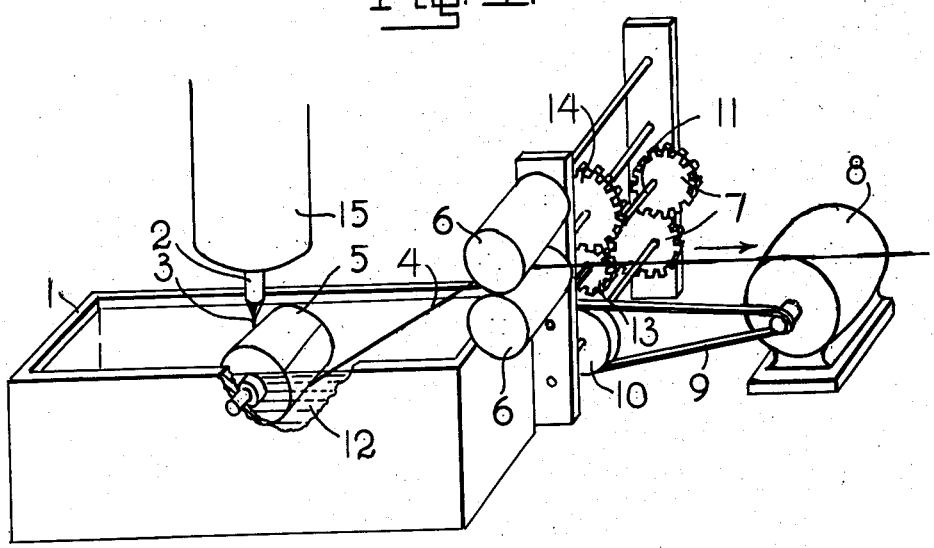

Aug. 11, 1942.  A. F. SMITH  2,292,905
ARTIFICIAL FILAMENT
Filed July 6, 1939

Inventor
Albert F. Smith
By A. F. Miller
Attorney

Patented Aug. 11, 1942

2,292,905

UNITED STATES PATENT OFFICE 2,292,905

ARTIFICIAL FILAMENT

Albert F. Smith, Wilmington, Del., assignor to E. I. du Pont de Nemours & Company, Wilmington, Del., a corporation of Delaware Application July 6, 1939, Serial No. 283,082

15 Claims. (Cl. 18—8)

This invention relates to tapered synthetic filaments, and more particularly to large regularly tapered filaments useful as bristles and as fishing tackle elements and to their manufacture.

This application is a continuation-in-part of my application Serial Number 232,683, filed September 30, 1938.

Tapered objects are frequently employed where good handle and maximum resilience of an elongated object is desired. Thus in making high quality paintbrushes, hog bristle, which is always tapered, is invariably used; horsehair, which is similar in composition to hog bristle but possesses no taper, cannot be used successfully. Although hog bristle has been the most satisfactory material available for making paintbrushes up to the present time, it possesses a number of serious disadvantages. The supply of bristle is uncertain at best and it is steadily diminishing because of the tendency to raise hogs which, though they furnish better meat, produce inferior bristle. Furthermore, hog bristles are very irregular in size and shape so that they must be laboriously sorted by hand into definite lengths which can then be used in paintbrush preparation. This nonuniformity necessitates the maintenance by brush concerns of a staff of bristle experts whose duty is to change the formulation of the brushes to accommodate the varying quality of the bristles. All these factors tend to make dressed hog bristles, and consequently brushes, quite expensive. Past attempts to make substitutes for hog bristle, for example from such materials as sisal, tampico, regenerated animal fibers, and cellulosic materials, have been unsuccessful.

Another field in which the value of taper has been recognized is fishing tackle. In order to obtain the best casting characteristics, fishermen demand not only tapered rods but also tapered lines and leaders. At present tapered leaders are made by tying together sections of level gut in decreasing sizes, but it is impossible by this procedure to obtain a knotless leader which tapers smoothly from one end to the other. Tapered lines are prepared by braiding together a large number of fine threads and varying the number of threads at intervals, but this procedure is laborious and time-consuming and gives tapered fishing lines which are expensive and not altogether satisfactory in strength or uniformity. It is apparent therefore that fishing tackle free from the above difficulties would be of great interest to fishermen.

It is therefore an object of this invention to prepare new and useful tapered filaments characterized by high strength, good resiliency, and good handle. Another object is to prepare tapered filaments in which the diameter varies in a regular manner along the length of the filament. Still another object is to prepare regularly tapered filaments useful as bristles, fishing leaders, and fishing lines. A more specific object is to prepare tapered bristles having a high taper ratio and to fabricate them into brushes. Other objects will appear as the description proceeds.

These objects are obtained by the procedure more fully described below which comprises in its broader aspects extruding a filament-forming synthetic polymer from a spinneret in predetermined form and causing at repeated intervals uniform variation in the mass of polymer passing a given point beyond the spinneret, said uniform variation arising from a variation in the take-off rate and/or the rate of extrusion, and then cold-drawing the filament and cutting it in the desired lengths. In its more specific and preferred form, these objects are accomplished by extruding synthetic linear polyamide filaments of average diameter ranging from 5 to 200 mils in the manner indicated above, cold drawing the filaments between closely spaced draw points, cutting the drawn filaments at the thick or thin sections or both, and then incorporating the filaments into the stock of a brush handle.

I realize that the preparation of uneven denier continuous filaments has been described previously, but these filaments have been of textile dimensions for use in making novelty yarns and fabrics. To enhance the novelty effect, the variation in denier has been irregular with short very thick sections or nubs scattered along the length of the yarn, and there has been no improvement in resiliency. Such yarns are never cut at the thick or thin sections, a procedure which is very important in preparing resilient objects according to the present invention. It should be noted, however, that the prior art filaments and fibers were not cold drawn nor were they in fact susceptible to cold drawing. The problem of making individually tapered filaments from a filament-forming material which requires cold drawing to attain its maximum usefulness has not previously been met. This problem presents difficulties because the force required to cold draw the thick sections is frequently sufficient to break the thin sections. This difficulty is particularly acute when it is desired to convert such a filament-forming material into oriented bristles having the high taper ratio of those which form a particular object of this invention. As far as I am aware, the preparation of regularly tapered bristles from any filament-forming material, regardless of whether it requires cold drawing or not, is an unknown art.

I have now found by using the process and materials described herein that tapered filaments can be produced which are far superior to natural bristles or to fishing tackle of the prior practice. My synthetic polyamide bristles have excellent snap and resilience, have uniform size, shape, and properties, and may be used to prepare brushes having excellent qualities. In addition to the advantages which result from the uniformity of the bristle, such as elimination of the tedious sorting and handling of bristle, my bristle is resistant to attack by moths and organisms and to all kinds of paint solvents, withstands the high temperatures used in the vulcanization of bristles into brushes, and possesses surprising wearing qualities. In standard abrasion tests in which a paintbrush made of synthetic bristle was compared with one made of hog bristle, the synthetic bristle brush showed less than half as much wear as the hog bristle brush which indicates that my brushes will outlast conventional brushes at least two to one. The importance of taper in the production of my synthetic bristle for use in paintbrushes is emphasized by the fact that, although untapered bristles are quite satisfactory for making toothbrushes, all attempts to prepare a satisfactory paintbrush from untapered synthetic polyamide bristles have been unsuccessful. The degree of taper is important for bristles to be used in paintbrushes. For this use the "taper ratio," i. e., the ratio of the diameter of the large end of the bristle to the diameter of the small end, should in general be between 1.5 and 3.5, and the bristle length should not exceed 15 inches and will usually be between about 2.5 and 12 inches.

A convenient method for carrying out my invention consists in extruding a filamentary stream of molten fiber-forming synthetic polyamide from an orifice through a quenching bath to a take-off mechanism which is run with a uniformly varying speed to secure a regular variation in the diameter of the filament. After the tapered filament has been spun, it is preferably soaked in water or other mild swelling agent therefor and then elongated from 200 to 700% of its original length, preferably about 400% in the case of polyhexamethylene adipamide. By treating the filament after the cold drawing operation with hot water, steam or other mild swelling agent for the polymer, it is set in the shape it is submitted to such treatment and so given good resistance to deformation. This procedure is important in the preparation of bristles and it is used to advantage also in the preparation of fishing lines and leaders since it reduces their tendency to set in coils or tangles. After the cold drawing treatment (and after the setting treatment it is so desired), the filament is cut at the thin or thick sections or both depending on the purpose for which it is to be used.

Figure 2:
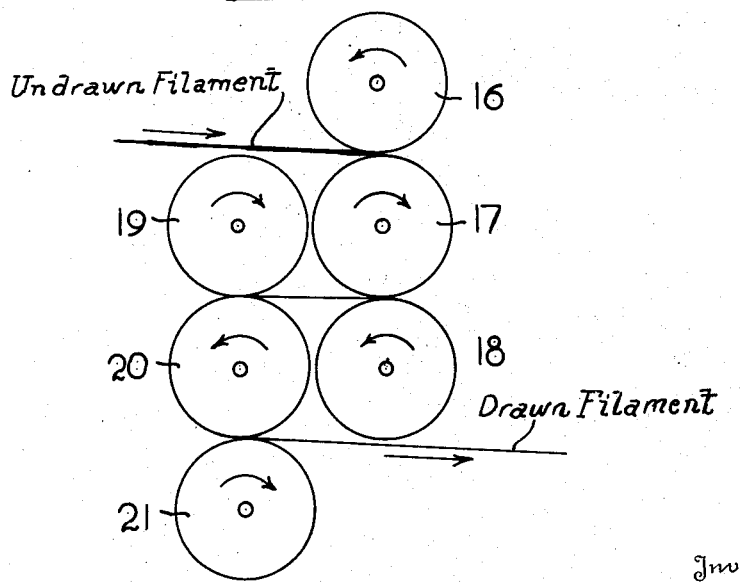

Fig. 1 in the accompanying drawing is a perspective view of a form of mechanism used in carrying out my invention; and Fig. 2 is a diagrammatic view in elevation of a mechanism for cold-drawing the tapered filament obtained by the apparatus of Fig. 1.

The molten polymer contained in the reservoir 15 passes through the spinneret 2 provided with a number of small holes through which the polymer is extruded in the form of a plurality of filaments 3. These filaments combine to a single bundle of filaments 4 which is drawn around the guide roll 5 by the pinch rolls 6 from which the filament bundle passes to a wind-up roll (not shown). The roll 5 is journaled in the receptacle 1 and partly submerged in the water 12 contained therein which quenches the hot filaments as they are extruded from the spinneret.

The pinch rolls, which are preferably made of soft rubber, are driven through the meshing gears 13 and 14 by the meshing elliptic gears 7. The speed of the pinch rolls varies regularly during the course of each revolution of the elliptic gears or cams 7. By changing the relative size of the meshing gears 13 and 14, the fraction of a revolution of the pinch rolls represented by a revolution of the elliptic gears may be varied at will so that various lengths of tapered bristle may be spun. The lower elliptic gear is driven by the motor 8 through chain 9 and sprocket 10. The variation in the speed of the pinch rolls causes a corresponding variation in the speed at which the filaments 3 are drawn from the spinneret 2. As a result, the filaments have regularly spaced lengths of uniform taper. It is possible to operate the spinning machine of Fig. 1 without the gears 13 and 14 by driving the pinch rolls directly with the shaft to which the upper elliptic gear is attached but such an apparatus is restricted to the preparation of tapered filaments of a given length and is therefore less flexible than the apparatus shown in the drawing.

To secure good results in the practice of this invention, several precautions must be taken. In the spinning operation care must be taken that the filaments in the quenching bath between the take-off mechanism and the spinneret do not pass around sharp corners or meet with excessive resistance, which might cause them to stretch, in order to prevent a damping out of the motion of the take-off mechanism which imparts the regular variation in the diameter of the filament. The subsequent step of cold drawing is even more critical. For example, in the production of bristle which is four inches long in the final cold drawn state and has a taper ratio of 2.0, it is necessary to spin a filament in which distance between the thick and thin sections of the undrawn filament is one inch and the diameter of the thin section is half that of the thick section. Since the force required to cold draw such filaments closely approaches the breaking strength of the filament at the thin sections, extraordinary measures must be taken in cold drawing to prevent breakage. To accomplish this the filaments are preferably first soaked in some liquid such as water which improves the cold drawing properties and then cold drawn on a machine in which the draw points are very close together. One type of machine suitable for cold drawing such bristles is shown in Fig. 2.

In the cold drawing machine illustrated in Fig. 2, rolls 16, 17, and 18 are geared together and are approximately of the same size. Rolls 19, 20, and 21 are geared together and run at approximately four times the speed of 16, 17, and 18. Usually rolls 16, 18, 19, and 21 are covered with rubber and rolls 17 and 20 are of metal. In this machine, the undrawn filament passes in between rolls 16 and 17, around roll 17, between rolls 17 and 18, and then between rolls 19 and 20, around roll 20, and out between rolls 20 and 21. Between rolls 17 and 18, and 19 and 20 the filament is elongated to four times its original length. The essential features of any machine used for drawing highly tapered bristle is that the points between which drawing tension is applied be quite close together. In this particular machine the rolls are 1.06 inches in diameter and the distance between centers of rolls 19 and 17 is about 1.2 inches. The closer the draw points are together, the more satisfactory the drawing. In general, machines in which the draw points are further apart than one-half the distance between the thickest and thinnest sections in the drawn filament have given poor results.

The following examples will show more fully the method used in carrying out my invention:

EXAMPLE I

Employing an apparatus like that shown in Fig. 1, molten polyhexamethylene adipamide, containing 0.2% of finely divided carbon black and having a melt viscosity measured at 285° C. of about 660 poises, was extruded through an eight-hole spinneret into a quenching bath 12. Each hole of the spinneret was 0.020 inch in diameter and the spinneret face was 0.25 inch from the surface of the water. In the quenching bath, the filaments passed around the guide 5 having a diameter of about 4 inches, which was used to insure against damping of the take-off motion by passage of the filament around sharp corners, out of the bath to the pair of pinch rolls 6 of 6 inches circumference which govern the take-off rate. The pinch rolls were driven as indicated in Fig. 1. The meshing gear 13 was one-half as large as 14 so that the increase and decrease in speed accompanying each revolution of the elliptic gear occurred twice during each revolution of the pinch rolls. The driving elliptical gear was rotated at a constant speed by the electric motor 8, the speed of which could be changed mechanically so as to secure different diameters of filaments if desired. The ratio of the high speed to the low speed of the elliptic gear was 3.15. The diameter of the filaments obtained in this matter was 0.012 inch at the thick section and 0.007 inch at the thin with a distance between the thick and thin sections of about 1.5 inches. The filaments were soaked 16 hours in water and cold drawn to approximately four times their original length, using the machine shown in Fig. 2. While held in a straight position, the filaments were immersed in boiling water for 30 minutes. After removal from the water and drying, the filaments were cut at the thick and thin sections to give bristles approximately 6 inches long, the diameter of which was about 0.006 inch at the thick and 0.0035 inch at the thin end.

Tapered bristles made up in a similar manner, but using various sets of meshing gears 13 and 14 to obtain various lengths and different elliptic gears to secure other taper ratios, were employed in the formulation of a 4 inch flat wall paintbrush 1.06 inches thick, as shown in Table I.

TABLE I

*Formulation of paintbrush made up from tapered polyamide bristle*

| Percent by weight | Diameter in mils | | Length of bristles in inches | |
|---|---|---|---|---|
| | Large end | Small end | As originally cut | As trimmed for use |
| 30 | 10 | 4 | 6 | 5-4 |
| 30 | 10 | 4 | 5.5 | 5-4.5 |
| 20 | 10 | 4 | 4.5 | 4.5 |
| 10 | 12 | 6.5 | 6 | 5 |
| 10 | 13 | 5 | 6 | 5-4.5 |

Bristles in the well mixed formulations indicated in the table were pointed at the tips by holding against a disc of revolving sandpaper and then vulcanized into a paintbrush handle in the customary manner. The brush thus prepared had good painting qualities.

EXAMPLE II

For the preparation of a uniformly tapered fishing leader, molten polyhexamethylene adipamide having an intrinsic viscosity of 0.88 measured at 25° C. and a melt viscosity of 450 poises at 285° C. was extruded at a constant rate through an orifice 0.04 inch in diameter. The filament thus formed was led through a quenching bath, the surface of which was one inch below the orifice, to a pair of pinch rolls one of which was round and the other of which had the shape indicated in Table II below. This latter roll (take-off roll) was so designed that when rotating at a constant angular speed, the peripheral speed varied from 1 to about 3.2 during the course of a single revolution. The total perimeter of the roll was 64 inches so that a regular variation in the diameter of the filament was obtained over 32 inch lengths. After water soaking 16 hours, the filament was cold drawn to four times its original length and cut at the thick and thin sections to give tapered fishing leaders about 128 inches long in which the diameter of the thick end was about twice that of the thin. These tapered leaders were especially useful because of the absence of knots. The resistance of the leaders to coiling was improved by holding them in a straight position under tension in boiling water for two hours. Leaders dyed with blue dye had an appearance which is considered desirable for certain kinds of leaders.

TABLE II

*Take-off roll for preparing tapered leaders*

| Distance in inches along the periphery of the roll measured in either direction from the point of maximum distance from the axis of revolution | Distance in inches from periphery of the roll to the axis of revolution | Relative diameter of filaments at 4-inch intervals |
|---|---|---|
| 0 | 19.00 | 18.00 |
| 4 | 15.80 | 19.75 |
| 8 | 13.32 | 21.50 |
| 12 | 11.40 | 23.25 |
| 16 | 9.83 | 25.00 |
| 20 | 8.58 | 26.75 |
| 24 | 7.57 | 28.50 |
| 28 | 6.73 | 30.25 |
| 32 | 6.02 | 32.00 |

EXAMPLE III

To prepare a tapered fishline, molten polyhexamethylene sebacamide having an intrinsic viscosity of 0.88 measured at 25° C. and a melt viscosity of 450 poises measured at 285° C. was extruded from an orifice 0.125 inch in diameter at a constant rate into a quenching bath of water, the surface of which was one inch below the spinneret orifice. The filament was withdrawn from the quenching bath by passing it around the roll, the peripheral speed of which was regulated to produce a constantly accelerating speed for one-half of the cycle and a speed decelerating the same amount in the other half of the cycle. This procedure produced a polyamide filament, the diameter of which increased uniformly in the first ten feet of its length and decreased uniformly during the last ten feet with the diameter of the thickest portion about twice that of the thinnest portion. After soaking in water for 16 hours, the filament was cold drawn to approximately four times its original length. The resultant filament was smooth, strong, flexible and tough, and when cut at the thin sections was useful as a tapered fishline.

EXAMPLE IV

A quantity of uniformly tapered cold drawn filament having a diameter at the thin portions of four mils and at the thick portions of 10 mils and having a distance of six inches between the thin and thick portions was cut at the thin portions to give bristles 12 inches long, tapered from each end to a thick center section. These bristles were fabricated into a novel type of paintbrush as follows. The bristles were bent so that the thin ends were brought together, i. e., doubled over about the center. The thick sections were then fastened to the handle of a paintbrush in such a way that the ferrule of the paintbrush covered the bent section of the bristles and the thin ends projected in the same manner as in a conventional paintbrush. The bristle was secured in the paintbrush handle by passing a bar through a loop made by the bristles at the bent section and fastening the bar securely at either end. The brush thus made from the U-shaped bristle was useful for painting and was characterized by extremely good anchorage of the bristle, i. e., the bristles would not readily pull out or be lost during painting. This constitutes a novel method of making a paintbrush.

This invention is not limited to the preparation of tapered filaments from the polymer indicated in the foregoing examples. As already indicated, the invention is applicable broadly to filament-forming synthetic polymers. The preferred polymers are polyamides of the types described in U. S. Patents 2,071,250, 2,071,253, and 2,130,948. These polyamides are prepared from bifunctional polyamide-forming reactants and contain amide groups as an integral part of the main chain of atoms in the polymer. It is not essential that the linking group in the polymer chain consist solely of amide groups; they may also contain other groups, e. g. ester groups.

The polyamides are of two general types, those derived from diamines and suitable dicarboxylic acids or amide-forming derivatives of dibasic carboxylic acid, and those derived from polymerizable amino acids or amide-forming derivatives thereof, e. g. esters and lactams. On hydrolysis with hydrochloric acid the polyamides yield polyamide-forming reactants; polyamides of the diamine-dibasic acid type yield a diamine hydrochloride and a dibasic carboxylic acid, whereas those of the amino acid type yield an amino acid hydrochloride. As specific examples of such polyamides may be mentioned polydecamethylene adipamide, polyhexamethylene sebacamide, polypentamethylene sebacamide, polyoctamethylene adipamide, 6-aminocaproic acid polymer, and 11-aminoundecanoic acid polymer. Mixtures of polyamides and interpolyamides may also be used. Examples of such interpolyamides are those derived from hexamethylenediamine, decamethylenediamine, adipic acid and sebacic acid, and from hexamethylenediamine, adipic acid, and 6-aminocaproic acid. As examples of polyamides containing groupings other than amide-groupings may be mentioned ester-amide interpolymers, such as may be derived from a diamine, a dibasic acid, and a glycol or from an amino acid and an hydroxy acid. The term "polyamide" as used in this application includes polymers containing a plurality of groups of structure

regardless of the nature of the atom to which the indicated free linkages are attached. The term includes polymers derived from a glycol and a diisocyanate or a diisothiocyanate.

The tapered filaments of this invention need not necessary consists wholly of polyamide or modified polyamide. It is frequently desired to deluster and/or color the filaments by adding a pigment to the polymer or to the reactants from which the polymer is prepared. It is also useful in many cases to dye the filament, for example, with calico black, Sudan brown, etc. Thus, fishing lines or leaders may be made to resemble closely water of almost any color or turbidity by the proper choice of dyes or pigments. Bristles may also be made of any desired color. The coloring of bristles by incorporating pigment in the polymer is a particularly desirable feature since there is no possibility of the colors bleeding out during use.

When increased flexibility is desired, as for instance in fishing lines and leaders, the polyamide may be modified with plasticizers, for example, phenols or aryl sulfonamides. Fillers, resins, antioxidants, etc., may also be employed. The use of surface modifying agents or water repellents is usually unnecessary but it is within the scope of this invention to so treat the tapered articles. It is also possible to modify the bristles by grinding, splitting, or otherwise altering the tips to improve such properties as paint retention and brushing characteristics.

The invention may utilize methods other than the ones given in the examples for tapering the bristles inasmuch as it will be apparent from the principles outlined herein that any arrangement may be used which will secure a controllable variation in the mass of polymer passing a given point beyond the spinneret. In addition to the many kinds of mechanical contrivances such as cams, irregular gears, variable friction devices, etc., useful for the purpose, it is possible to secure a variation by reducing the speed of the uniformly rotating take-off rolls below a certain minimum at which a spontaneous oscillation of the bristle in the quenching bath begins. This oscillation gives a varying rate of take-off of the polymer from the orifice and a resultant taper. It is also possible to feed the polymer to the orifice at a variable rate and thus to obtain a tapered filament at a constant take-off rate. The same object may be obtained by varying both.

Although tapered polyamide filaments are particularly useful in paintbrushes and in fishing tackle, their application is not so limited. The properties of resilience, resistance to chemical agents, uniformity, sterility, resistance to high temperature, immunity to attack from organisms, and ability to retain their color in use make them valuable in many other applications including pastry brushes, bottle brushes, polishing brushes, etc. Although taper is not necessary in bristles to be used for toothbrushes, tapered bristles may be used for this purpose. Further, it is often desirable to use synthetic bristles in admixture with natural bristles to secure improvement in such qualities as wear resistance and resiliency and to reduce the cost. Further, the tapered bristles of this invention may be used in other ways not related to bristle or fishing tackle. For example, they may be used to secure novel decorative effects, e. g., in millinery. Although the invention is described with particular reference to the preparation of large filaments, it is also applicable to the preparation of small filaments for use in yarns and fabrics.

Although the tapered filaments are most useful after cold drawing, it is within the scope of the invention to use them in the unoriented condition, i. e., without cold drawing. Thus undrawn tapered bristles can be used in brushes.

As already indicated, the process of this invention allows the preparation of tapered articles which are far superior in many respects to the articles now in use. The taper of bristles can be controlled and regulated to the desired value and bristles can be made of any specified length. By running a mechanical cutting device in conjunction with the drawing machine, the process can be made almost completely automatic. The uniformity in size and shape of my bristles also makes it possible to set up definite standards for a particular kind of brush. My bristles are quite resistant to the high temperature necessary for vulcanizing the rubber commonly used in settling the bristles in a brush. Furthermore, the chemical inertness and solvent resistance of my bristles permits the use of many other anchoring materials, such as cement, resins, etc. The bristles may, for example, be attached to the ferrule of the paintbrush by setting the bristles in a solution of methyl methacrylate polymer in methyl methacrylate monomer and completing the polymerization. Another advantage of my tapered bristles is that they can be produced entirely from domestic materials.

The advantages of tapered polyamide fishing lines and leaders are equally numerous. Leaders can be economically made free from knots and of any desired length and degree of taper. They are smooth and retain their desirable properties well in water, can be used without presoaking, and are highly resistant to deterioration by atmospheric conditions or organisms. Fishing lines may be made in the form of a monofil (single filament) with its inherent advantages of greater density, stiffness, and wearing qualities at a cost considerably below that of conventional tapered lines. My lines are smooth, have excellent abrasion resistance, good flexibility, good casting characteristics, and less tendency to tangle than those now in use.

As many apparently widely different embodiments of this invention may be made without departing from the spirit and scope thereof, it is to be understood that I do not limit myself to the specific embodiments thereof except as defined in the appended claims.

I claim:

1. A process for preparing tapered bristles which comprises extruding molten filament-forming synthetic polyamide from a spinneret, uniformly varying at repeated regular intervals the rate at which the extruded filaments are withdrawn from the spinneret, cold drawing the tapered filament thereby formed between closely spaced draw points, and then cutting the filament at the thick and thin sections.

2. The process set forth in claim 1 wherein the cold drawing is effected between draw points whose distance apart is less than one-half the distance between the thick and thin sections of the cold drawn filament.

3. A process for preparing tapered filaments from a molten filament-forming synthetic polymer capable of being cold-drawn, which comprises extruding from a spinneret said molten polymer in filamentary form, passing the filament from the spinneret through a space of not more than one inch into a quenching bath, imparting at repeated intervals uniform variation in the mass of polymer passing the point beyond the spinneret where the polymer solidifies thereby forming a tapered filament, and cold-drawing the tapered filament thus formed.

4. The process set forth in claim 3 wherein the variation in the mass of polymer passing the point beyond the spinneret where the polymer solidifies is obtained by varying at repeated regular intervals the rate at which the filament is withdrawn from the spinneret.

5. In the manufacture of tapered filaments from a molten filament-forming synthetic polymer capable of being cold-drawn, the process which comprises extruding from a spinneret said molten polymer in filamentary form, passing the filament from the spinneret through a space of not more than one inch into a liquid cooling zone, withdrawing the filament from the spinneret at a greater rate than the linear speed of extrusion and uniformly varying at repeated intervals the rate at which the filament is withdrawn from the spinneret, and cold-drawing the resultant tapered filament.

6. In the manufacture of tapered filaments from a molten filament-forming synthetic polymer capable of being cold-drawn, the process which comprises extruding from a spinneret said molten polymer in filamentary form, passing the filament from the spinneret through a space of not more than one inch into a quenching bath, uniformly varying at repeated intervals the rate at which the extruded filament is withdrawn from the spinneret to such an extent that the average diameter of the resultant tapered filament is between 5 and 200 mils, cold-drawing said tapered filament and cutting the drawn filament at the thin sections thereof.

7. A process for preparing tapered filaments from a molten filament-forming synthetic polymer capable of being cold-drawn, which comprises extruding from a spinneret said molten polymer in filamentary form, passing the filament from the spinneret into a quenching bath, uniformly varying at repeated regular intervals the rate at which the extruded filaments are withdrawn from the spinneret, and cold-drawing the tapered filament thereby formed between closely spaced draw points.

8. The process set forth in claim 7 wherein the cold-drawing is effected between draw points whose distance apart is less than one-half the distance between the thick and thin sections of the cold-drawn filament.

9. Apparatus suitable for the production of tapered filaments from molten filament-forming synthetic polymers capable of being cold-drawn, which comprises in combination a spinneret adapted for extrusion of the molten polymer into filaments, a vessel adapted to contain quenching liquid for receiving the extruded filaments, said spinneret being located outside of and not over approximately one inch from the highest level for quenching liquid in said vessel, take-up means for providing continuous movement of the filament from the spinneret through said quenching vessel, and mechanism activating said take-up means for regularly and uniformly varying the speed of the moving filament from said spinneret through said quenching vessel to said take-up means.

10. The process set forth in claim 3 wherein the polymer is a synthetic linear polyamide.

11. The process of manufacture set forth in claim 5, wherein said polymer is a synthetic linear polyamide.

12. The process of manufacture set forth in claim 5, wherein said polymer is polyhexamethylene adipamide.

13. The process set forth in claim 6 wherein said polmer is a synthetic linear polyamide.

14. Apparatus suitable for the production of tapered bristles from molten synthetic linear polymer which comprises, in combination, a spinneret adapted for extrusion of the molten polymer into filaments, a guide roll for receiving the extruded filaments positioned in a vessel adapted to contain quenching liquid, take-up means providing continuous movement of the filament from the spinneret, and mechanism activating said take-up means for regularly and uniformly varying the speed of the moving filament between said guide roll and take-up means; the said spinneret being located outside of and not over approximately one inch from the highest level for quenching liquid in the said vessel.

15. Apparatus for the production of tapered bristles from molten synthetic polymer which comprises, in combination, a spinneret adapted for extrusion of the molten polymer into filaments, a guide roll for receiving the extruded filaments positioned in a vessel adapted to contain quenching liquid, pinch rolls for continuously drawing the filament around said guide roll, and means for regularly varying the speed of said pinch rolls; the said spinneret being located outside of and not over approximately one inch from the highest level for quenching liquid in the said vessel.

ALBERT F. SMITH.